(12) United States Patent
Kato et al.

(10) Patent No.: US 11,515,828 B2
(45) Date of Patent: Nov. 29, 2022

(54) MOTOR DRIVE CONTROL DEVICE, MOTOR DRIVE CONTROL SYSTEM AND FAN SYSTEM

(71) Applicant: MINEBEA MITSUMI Inc., Nagano (JP)

(72) Inventors: Hiroyuki Kato, Fukuroi (JP); Toshikazu Koshiba, Kakegawa (JP); Katsunori Yamamoto, Iwata (JP)

(73) Assignee: MINEBEA MITSUMI Inc., Nagano (JP)

( * ) Notice: Subject to any disclaimer, the term of this patent is extended or adjusted under 35 U.S.C. 154(b) by 38 days.

(21) Appl. No.: 17/234,928

(22) Filed: Apr. 20, 2021

(65) Prior Publication Data

US 2021/0359633 A1   Nov. 18, 2021

(30) Foreign Application Priority Data

May 12, 2020   (JP) .............................. JP2020-083992

(51) Int. Cl.
*H02P 27/08* (2006.01)
*F04D 25/06* (2006.01)
(Continued)

(52) U.S. Cl.
CPC .............. *H02P 27/08* (2013.01); *F04D 25/06* (2013.01); *F04D 29/18* (2013.01); *H02P 23/14* (2013.01); *H02P 29/02* (2013.01); *H02P 29/60* (2016.02)

(58) Field of Classification Search
CPC ........ H02P 29/00; H02P 29/02; H02P 29/024; H02P 29/0241; H02P 29/025; H02P 29/027; H02P 29/028; H02P 29/60; H02P 27/00; H02P 27/04; H02P 27/06; H02P 27/08; H02P 27/085; H02P 25/00; H02P 25/062; H02P 25/03; H02P 25/064; H02P 25/086; H02P 25/107; H02P 25/14; H02P 21/00; H02P 21/18; H02P 21/22; H02P 23/00;
(Continued)

(56) References Cited

U.S. PATENT DOCUMENTS 7,882,394 B2 * 2/2011 Hosek ................... G06F 11/008
                                                    714/48
2017/0331413 A1   11/2017 Kitano et al.

FOREIGN PATENT DOCUMENTS

JP         2017-204989 A    11/2017

* cited by examiner

*Primary Examiner* — Antony M Paul
(74) *Attorney, Agent, or Firm* — Pearne & Gordon LLP

(57) ABSTRACT

A motor drive control device 1 includes a drive voltage generation circuit 13 configured to generate a drive voltage Vin based on a first supply voltage Vdc inputted to a first terminal P1 and generate the drive voltage Vin based on a second supply voltage inputted to a second terminal P2 when a supply of the first supply voltage Vdc is stopped, a control circuit 21 configured to be operable by the drive voltage Vin, generate a drive control signal Sd based on a drive command signal Sc, generate a motor driving information signal So and output the motor driving information signal So from a third terminal P3 and a motor drive circuit 10 configured to output a drive signal to the motor 3, in which the control circuit 21 monitors the first supply voltage Vdc and outputs history information 300 relating to operation of the motor 3 from the third terminal P3 as the motor driving information signal So upon detecting that the supply of the first supply voltage Vdc is stopped.

11 Claims, 8 Drawing Sheets

(51) Int. Cl.
    *F04D 29/18*      (2006.01)
    *H02P 23/14*      (2006.01)
    *H02P 29/60*      (2016.01)
    *H02P 29/02*      (2016.01)

(58) Field of Classification Search
    CPC ........ H02P 23/0027; H02P 23/14; H02P 7/00;
            H02P 7/29; H02P 6/00; H02P 6/12; H02P
            6/32; H02P 6/24; H02P 3/00; H02P 3/06;
            H02P 1/00; H02P 1/04; H02P 1/16; H02P
            1/24; H02P 1/26; H02P 1/42; H02P 1/46;
              H02H 7/08; F04D 29/18; F04D 25/06
    See application file for complete search history.

<DURING NORMAL OPERATION>

<WHEN FIRST SUPPLY VOLTAGE IS LOST>

<WHEN CONTROL CIRCUIT 21 IS OUT OF CONTROL>

MOTOR DRIVE CONTROL DEVICE, MOTOR DRIVE CONTROL SYSTEM AND FAN SYSTEM

CROSS REFERENCE TO RELATED APPLICATIONS

This application claims the benefit of Japanese Patent Application No. 2020-083992, filed May 12, 2020, which is hereby incorporated by reference in its entirety.

BACKGROUND

Technical Field

The present disclosure relates to a motor drive control device, a motor drive control system and a fan system.

Background

Conventionally, information processing devices (e.g., server) equipped with a fan (fan motor) to rotate an impeller by a rotational force of a motor require maintenance and regular inspections according to an operation time with an intrinsic failure time and expected life taken into consideration to guarantee stable operation.

Therefore, motor drive control devices are conventionally known, which are configured to store information showing a history of operation of a motor such as a cumulative number of rotations and cumulative drive time of the motor and output the information to an external computer (host device) through an information output path (see Japanese Patent Application Laid-Open No. 2017-204989).

Some of such motor drive control devices come with a fuse provided in a power supply path of a control circuit such as a microcontroller integrally controlling the motor or the drive of the motor to prevent failures of electronic parts or electric fire accidents due to an overcurrent.

Prior to the present disclosure, the inventors of the present disclosure studied incorporating a control circuit (microcontroller) having a function to output information showing a history of operations of a motor such as a cumulative number of rotations and a cumulative drive time to an external device as described in Japanese Patent Application Laid-Open No. 2017-204989, into a motor drive control device with a fuse provided in a power supply path. As a result of the study, the following issues have been revealed.

For example, suppose a case of a motor drive control device provided with a fuse where some abnormalities occur in the motor and a high current flows in a power supply path. In this case, the high current causes the fuse to blow and a power supply from the power source to the motor and the control circuit is interrupted. This causes not only the motor but also the control circuit to stop operation, making it impossible to read history information relating to operation of the motor such as cumulative information, operation state information, abnormality detection information of the motor from the control circuit. As a result, it is difficult for a user to identify causes of the abnormalities generated in the motor or the motor drive control device, and solving the problem may require a lot of time.

The present disclosure is related to making it possible to output history information concerning operation of a motor to the outside even if a power supply path to the motor is interrupted.

SUMMARY

A motor drive control device according to an exemplary embodiment includes a first terminal, a second terminal and a third terminal, a drive voltage generation circuit configured to generate a drive voltage based on a first supply voltage inputted to the first terminal and generate the drive voltage based on a second supply voltage inputted to the second terminal when a supply of the first supply voltage is stopped, a control circuit configured to be operable by a supply of the drive voltage, generate a drive control signal based on a drive command signal including a command relating to a drive of a motor, generate a motor driving information signal relating to a drive state of the motor and output the motor driving information signal from the third terminal and a motor drive circuit configured to output a drive signal to the motor based on the drive control signal generated by the control circuit, in which the control circuit monitors the first supply voltage and outputs history information relating to operation of the motor from the third terminal as the motor driving information signal upon detecting that the supply of the first supply voltage is stopped.

According to one aspect of the present disclosure, it is possible to output history information relating to operation of a motor to an outside even if a power supply path to the motor is interrupted.

DETAILED DESCRIPTION

1. Overview of Embodiments

Figure 1:
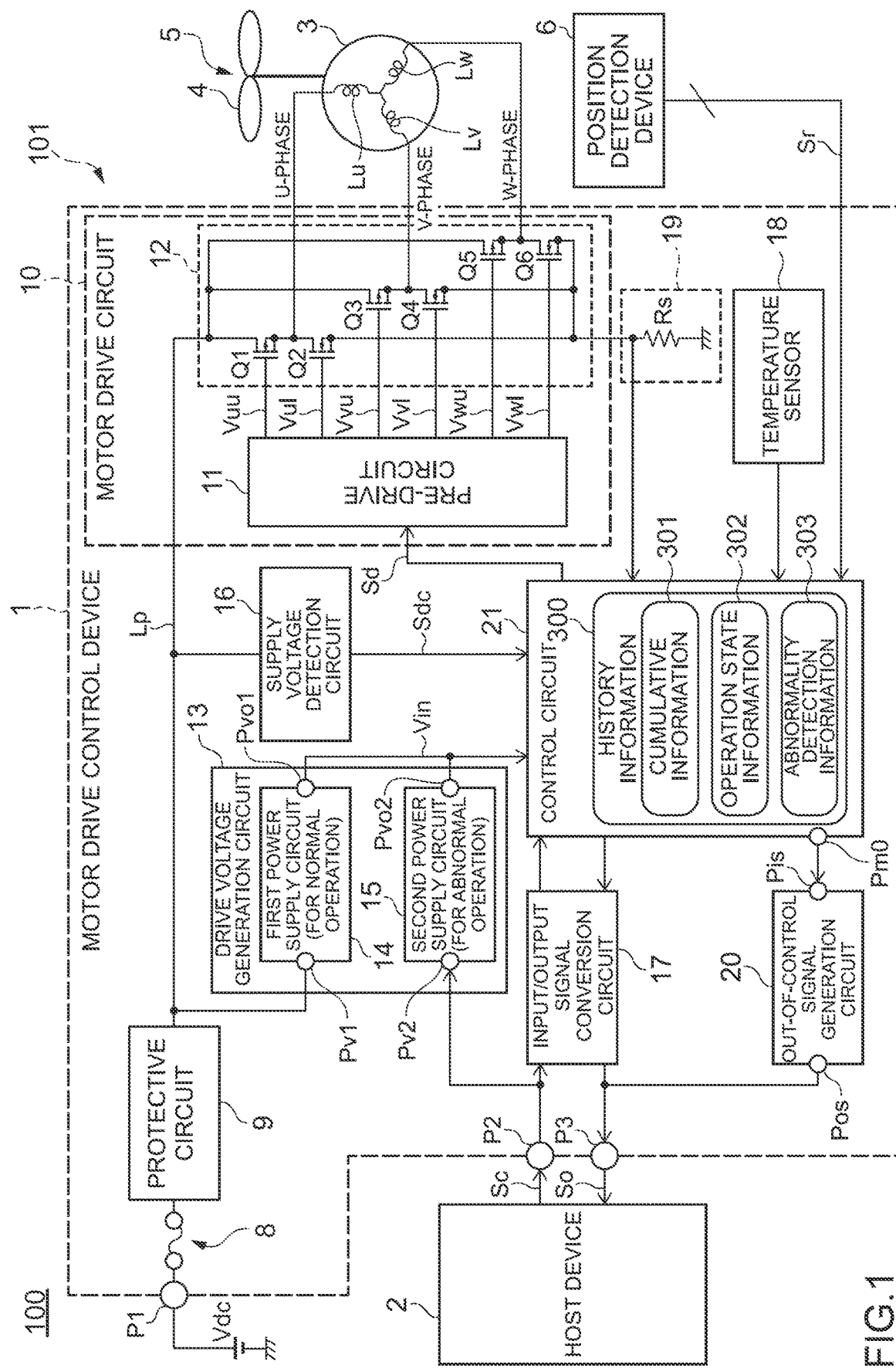
FIG. 1 is a diagram illustrating a configuration of a motor drive control system 100 provided with a motor drive control device 1 according to an embodiment of the present disclosure.

First, an overview of exemplary embodiments of the disclosure disclosed in the present application will be described. Note that reference numerals on drawings corresponding to components of the disclosure will be described in parentheses.

[1] A motor drive control device (1) according to an exemplary embodiment of the present disclosure includes a first terminal (P1), a second terminal (P2) and a third terminal (P3), a drive voltage generation circuit (13) configured to generate a drive voltage (Vin) based on a first supply voltage (Vdc) inputted to the first terminal and generate the drive voltage based on a second supply voltage inputted to the second terminal when a supply of the first supply voltage is stopped, a control circuit (21) configured to be operable by a supply of the drive voltage, generate a drive control signal (Sd) based on a drive command signal (Sc) including a command relating to the drive of the motor (3), generate a motor driving information signal relating to a drive state of the motor and output the motor driving information signal from the third terminal and a motor drive circuit (10) configured to output a drive signal to the motor based on the drive control signal generated by the control circuit, in which the control circuit monitors the first supply voltage and outputs history information (300) relating to operation of the motor from the third terminal as the motor driving information signal upon detecting that the supply of the first supply voltage is stopped.

[2] In the motor drive control device described in [1] above, the second terminal (P2) is an input terminal to input the drive command signal (Sc), the control circuit may generate the drive control signal based on the drive command signal upon detecting that the first supply voltage is supplied and when the drive command signal is inputted to the second terminal and the drive voltage generation circuit may generate the drive voltage using the drive command signal as the second supply voltage upon detecting that the supply of the first supply voltage is stopped and when the drive command signal with a duty ratio of 100% is inputted to the second terminal.

[3] In the motor drive control device described in [2] above, the control circuit may output a rotational speed signal corresponding to a rotational speed of the motor from the third terminal (P3) as the motor driving information signal upon detecting that the supply of the first supply voltage is not stopped and the control circuit may switch the motor driving information signal to be outputted from the third terminal from the rotational speed signal to the history information upon detecting that the supply of the first supply voltage is stopped.

[4] The motor drive control device described in [3] above further includes an out-of-control signal generation circuit (20) configured to output an out-of-control signal indicating that the control circuit is out of control from the third terminal as the motor driving information signal when the control circuit is out of control, in which the rotational speed signal is a signal with a predetermined duty ratio and the out-of-control signal may be a signal with a duty ratio different from the duty ratio of the rotational speed signal.

[5] In the motor drive control device described in [4] above, the out-of-control signal generation circuit is an oscillator, and the out-of-control signal generation circuit may stop oscillation operation when the control circuit is controllable, and the out-of-control signal generation circuit may perform oscillation operation when the control circuit is out of control.

[6] In the motor drive control device described in any one of [1] to [5] above, the drive voltage generation circuit may include a first power supply circuit (14) configured to generate a first DC voltage as the drive voltage based on the first supply voltage and supply the first DC voltage to a power supply terminal of the control circuit and a second power supply circuit (15) configured to generate a second DC voltage based on the second supply voltage as the drive voltage and supply the second DC voltage to the power supply terminal, and the second power supply circuit may include a regulator circuit (150) configured to generate the second DC voltage based on the second supply voltage and a voltage monitoring circuit (151) configured to monitor the first DC voltage and stop operation of the regulator circuit when the first DC voltage is larger than a predetermined threshold and enable the regulator circuit to operate when the first DC voltage is smaller than the predetermined threshold.

[7] In the motor drive control device described in any one of [1] to [6] above, the history information may include cumulative information (301) indicating a degree of usage of the motor and the cumulative information may include at least one of a cumulative operating time of the motor and a cumulative number of rotations of the motor.

[8] In the motor drive control device described in any one of [1] to [7] above, the history information may include operation state information (302) indicating an operation state of the motor and the operation state information may include at least one piece of information on a temperature, a drive current of the motor and the drive voltage.

[9] In the motor drive control device described in any one of [1] to [8] above, the history information may include abnormality detection information (303) indicating contents of a detected abnormality and the abnormality detection information may include at least one piece of information on the temperature, the drive current of the motor and an abnormality relating to the drive voltage.

[10] A motor drive control system (100) according to an exemplary embodiment of the present disclosure includes the motor drive control device (1) according to any one of [1] to [9] above and a higher device (2) configured to output a pulse signal to the second terminal of the motor drive control device as the drive command signal and receive a rotational speed signal corresponding to a rotational speed of the motor from the third terminal of the motor drive control device, in which the host device outputs a pulse signal with a duty ratio of 100% to the second terminal upon detecting that the rotational speed signal is not inputted from the third terminal.

[11] A fan system (101) according to an exemplary embodiment of the present disclosure is provided with the motor drive control device (1) described in any one of [1] to [9] above, the motor (3) and a fan (5) including an impeller (4) configured to rotate by a rotational force of the motor.

2. Specific Examples of Embodiments

Hereinafter, specific examples of embodiments of the present disclosure will be described with reference to the accompanying drawings. Note that in the following description, components common among the respective embodiments are assigned the same reference numerals and duplicate description will be omitted.

Embodiments

FIG. 1 is a diagram illustrating a configuration of a motor drive control system provided with a motor drive control device according to an embodiment of the present disclosure.

A motor drive control system 100 illustrated in FIG. 1 is provided with a motor 3, a motor drive control device 1 configured to control the drive of the motor 3 and a host device 2 configured to control the motor drive control device 1. For example, an impeller 4 is connected to an output shaft (not shown) of the motor 3 and the motor 3 and the impeller 4 form a fan (fan motor) 5 configured to generate wind to rotate the impeller 4 by a rotational force of the motor 3. The fan 5 can be used as one of cooling apparatuses configured to discharge heat generated inside the device to an outside and cool an inside of the device, and can be mounted on a machine tool or the like used in an environment where oil mist, cutting chips, smoke, dust or the like is produced in addition to an information processing device such as a server. The fan 5 is, for example, an axial fan.

The fan 5 constructed of the motor 3 and the impeller 4, and the motor drive control device 1 form one fan system 101. In the present embodiment, a case will be described as an example where the fan 5 is used in an information processing device such as a server as a cooling apparatus.

The host device 2 is configured to output a drive command signal Sc to the motor drive control device 1, control rotation of the motor 3 via the motor drive control device 1, acquire a motor driving information signal So relating to a drive state of the motor 3 (fan 5) from the motor drive control device 1 and monitor operation of the motor 3 (fan 5). As will be described later, examples of the motor driving information signal So include a signal indicating a rotation state of the motor 3 (fan 5) (e.g., rotational speed signal corresponding to a rotational speed of the motor) and history information 300 relating to operation of the motor. The host device 2 is, for example, a program processing device such as a CPU in the server equipped with the fan 5.

The drive command signal Sc is a signal including a command relating to the drive of the motor 3. The drive command signal Sc is, for example, a signal indicating a target rotational speed of the motor 3 (target number of rotations). The drive command signal Sc is, for example, a PWM (pulse width modulation) signal with a duty ratio corresponding to the target rotational speed of the motor 3. Note that the drive command signal Sc may also be a signal of another format such as a PFM signal with a frequency corresponding to a target rotational speed or a torque command signal indicating a target value of torque of the motor.

During normal operation, the host device 2 outputs, for example, a PWM signal with a duty ratio corresponding to a target rotational speed as the drive command signal Sc to thereby instruct the motor drive control device 1 to rotate the motor 3 (fan 5) at a target rotational speed.

Upon detecting an abnormality on the motor drive control device 1 side (including the motor 3), the host device 2 issues a command to the motor drive control device 1 to acquire the history information 300 of the motor 3, which will be described later. For example, when a rotational speed signal corresponding to an actual rotational speed of the motor 3 is not outputted from the motor drive control device 1 as a motor driving information signal So despite the fact that the host device 2 has outputted the drive command signal Sc, the host device 2 outputs a PWM signal with a duty ratio of 100%, that is, a DC voltage as the drive command signal Sc to thereby supply a supply voltage (second supply voltage) to the motor drive control device 1 and read the history information 300 relating to the operation of the motor 3 from the motor drive control device 1.

In this way, the host device 2 switches instructions to the motor drive control device 1 by changing the duty ratio of the drive command signal Sc.

The motor 3 is, for example, a brushless DC motor. In the present embodiment, the motor 3 is a three-phase brushless DC motor with three-phase coils: U-phase, V-phase and W-phase. The motor drive control device 1 is configured to drive the motor 3, for example, by sine wave drive according to the drive command signal Sc from the host device 2. The motor drive control device 1 outputs a sine wave drive signal to the motor 3, periodically applies a sine-wave like drive current to coils Lu, Lv and Lw with U-phase, V-phase and W-phase of the motor 3 to thereby rotate the motor 3.

The position detection device 6 is an device configured to generate a position detection signal Sr corresponding to the rotation of the rotor of the motor 3. The position detection device 6 is, for example, a HALL element. For example, three Hall elements corresponding to the respective phases (U-phase, V-phase and W-phase) of the motor 3 are mounted around the motor 3 as the position detection device 6.

To be more specific, the three Hall elements as the position detection device 6 are arranged around the rotor of the motor 3 at mutually equal intervals (e.g., at 120-degree interval with respect to an adjacent Hall element). The three Hall elements detect the respective magnetic poles of the rotor and output a Hall signal, a voltage of which changes according to the rotation of the rotor. The Hall signal outputted from each Hall element is inputted to the control circuit 21 as the position detection signal Sr. As will be described later, the control circuit 21 obtains information on a rotational position, the number of rotations (e.g., FG signal) or the like of the motor 3 using the Hall signal as the position detection signal Sr, and can thereby detect the rotation state of the motor 3 and control the drive of the motor 3.

Note that an encoder or resolver or the like may be provided instead of Hall elements as the position detection device 6, and their detection signals may be inputted to the control circuit 21 as the position detection signals Sr.

The motor drive control device 1 controls the rotation of the motor 3 according to a command from the host device 2, stores the history information 300 relating to operation of the motor 3 and outputs the history information 300 to the host device 2 as the motor driving information signal So.

As illustrated in FIG. 1, the motor drive control device 1 includes a plurality of external terminals, a power interruption circuit 8, a protective circuit 9, a motor drive circuit 10, a drive voltage generation circuit 13, a supply voltage detection circuit 16, an input/output signal conversion circuit 17, a temperature sensor 18, a current detection circuit 19, an out-of-control signal generation circuit 20 and a control circuit 21. Note that the components of the motor drive control device 1 illustrated in FIG. 1 are part of the whole device and the motor drive control device 1 may include other components in addition to the components illustrated in FIG. 1.

The plurality of external terminals are terminals to connect the motor drive control device 1 and external devices (e.g., host device 2 and motor 3). FIG. 1 illustrates a first terminal P1, a second terminal P2 and a third terminal P3 as typical examples among external terminals of the motor drive control device 1.

The first terminal P1 is a power supply terminal to which a first supply voltage Vdc (DC voltage) is supplied as the main power source to drive the motor 3 and the motor drive control device 1. Hereinafter, the first terminal P1 will also be referred to as a "power supply terminal P1."

The second terminal P2 is an input terminal to input a signal from an external device such as the host device 2. For example, the drive command signal Sc outputted from the host device 2 is inputted to the second terminal P2. Hereinafter, the second terminal P2 will also be referred to as an "input terminal P2."

The third terminal P3 is an output terminal to output a signal to an external device such as the host device 2. For example, the motor driving information signal So relating to a drive state of the motor 3 (fan 5) is outputted from the third terminal P3 to the host device 2. Hereinafter, the third terminal P3 will also be referred to as an "output terminal P3."

The first supply voltage Vdc inputted to the power supply terminal P1 is supplied to a power supply line Lp via the power interruption circuit 8 and the protective circuit 9. The power interruption circuit 8 is a circuit configured to interrupt a power supply from the power supply terminal P1 to the power supply line Lp when a high current exceeding a rating flows from the power supply terminal P1 into the power supply line Lp. The power interruption circuit 8 is, for example, a fuse.

The protective circuit 9 is a circuit configured to prevent backflow of a current from the power supply line Lp to the power supply terminal P1 and constructed by including, for example, a diode. Note that the protective circuit 9 may also include a stabilizing capacitor to stabilize a voltage of the power supply line Lp.

The power interruption circuit 8 and the protective circuit 9 are connected in series between the power supply terminal P1 and the power supply line Lp.

The motor drive circuit 10 outputs a drive signal to the motor 3 to drive the motor 3 based on a drive control signal Sd outputted from the control circuit 21, which will be described later. The motor drive circuit 10 is configured to be operable by receiving a supply of power (first supply voltage Vdc) from the power supply line Lp. The motor drive circuit 10 includes an inverter circuit 12 and a pre-drive circuit 11.

The inverter circuit 12 is configured to output a drive signal to the motor 3 based on an output signal outputted from the pre-drive circuit 11 and energize the coils Lu, Lv and Lw provided for the motor 3. The inverter circuit 12 includes pairs of series circuits of two switch elements (a pair of switch elements Q1 and Q2, a pair of switch elements Q3 and Q4 and a pair of switch elements Q5 and Q6) connected in series between the power supply line Lp and a ground potential via the current detection circuit 19, which will be described later and connected to the coils Lu, Lv and Lw of the respective phases (U-phase, V-phase and W-phase). More specifically, a connection point between the switch elements Q1 and Q2 is connected to one terminal of the U-phase coil Lu, a connection point between the switch elements Q3 and Q4 is connected to one terminal of the V-phase coil Lv and a connection point between the switch elements Q5 and Q6 is connected to one terminal of the W-phase coil Lw.

The pre-drive circuit 11 generates an output signal to drive the inverter circuit 12 based on the drive control signal Sd from the control circuit 21 and outputs the output signal to the inverter circuit 12.

The drive control signal Sd is, for example, a PWM (pulse width modulation) signal. More specifically, the drive control signal Sd includes six types of PWM signals corresponding to the respective switch elements of the inverter circuit 12.

The pre-drive circuit 11 generates and outputs six types of drive signals Vuu, Vul, Vvu, Vvl, Vwu and Vwl to drive the respective switch elements of the inverter circuit 12 based on the drive control signal Sd. When these drive signals are inputted to the inverter circuit 12, the respective switch elements forming the inverter circuit 12 perform on/off operation. In this way, power is supplied to each phase of the motor 3 from the power supply line Lp.

The drive voltage generation circuit 13 is a circuit for generating a drive voltage Vin as a power source for the control circuit 21. The drive voltage generation circuit 13 generates the drive voltage Vin based on the first supply voltage Vdc inputted to the power supply terminal P1 and generates a drive voltage Vin based on the second supply voltage inputted to the input terminal P2 when the supply of the first supply voltage Vdc is stopped. More specifically, while the supply of the first supply voltage Vdc is stopped, if a drive command signal Sc with a duty ratio of 100% is inputted to the input terminal P2, the drive voltage generation circuit 13 generates the drive voltage Vin using the drive command signal Sc as the second supply voltage. Note that the drive voltage Vin generated based on the first supply voltage Vdc may differ from the drive voltage Vin generated based on the second supply voltage as long as the drive voltage Vin falls within the voltage range in which the control circuit 21 operates. For example, the drive voltage Vin generated based on the second supply voltage is lower than the drive voltage Vin generated based on the first supply voltage Vdc.

The drive voltage generation circuit 13 includes, for example, a first power supply circuit 14 and a second power supply circuit 15. The first power supply circuit 14 includes an input terminal Pv1 and an output terminal Pyo1, generates a first DC voltage based on the first supply voltage Vdc supplied from the power supply line Lp to the input terminal Pv1 and outputs the first DC voltage from the output terminal Pyo1 as the drive voltage Vin. The first power supply circuit 14 is, for example, a regulator circuit (series regulator or switching regulator) configured to step down the first supply voltage Vdc supplied to the input terminal Pv1 and generate the first DC voltage.

The second power supply circuit 15 includes an input terminal Pv2 and an output terminal Pvo2. The second power supply circuit 15 is a circuit configured to generate a second DC voltage based on the drive command signal Sc (second supply voltage) inputted to the input terminal Pv2 from the host device 2 via the input terminal P2 and output the second DC voltage from the output terminal Pvo2 as the drive voltage Vin. The second power supply circuit 15 monitors the first DC voltage outputted from the first power supply circuit 14, and stops the output of the second DC voltage if the first DC voltage is a predetermined threshold or more or outputs the second DC voltage as the drive voltage Vin if the first DC voltage is lower than the predetermined threshold.

Figure 2:
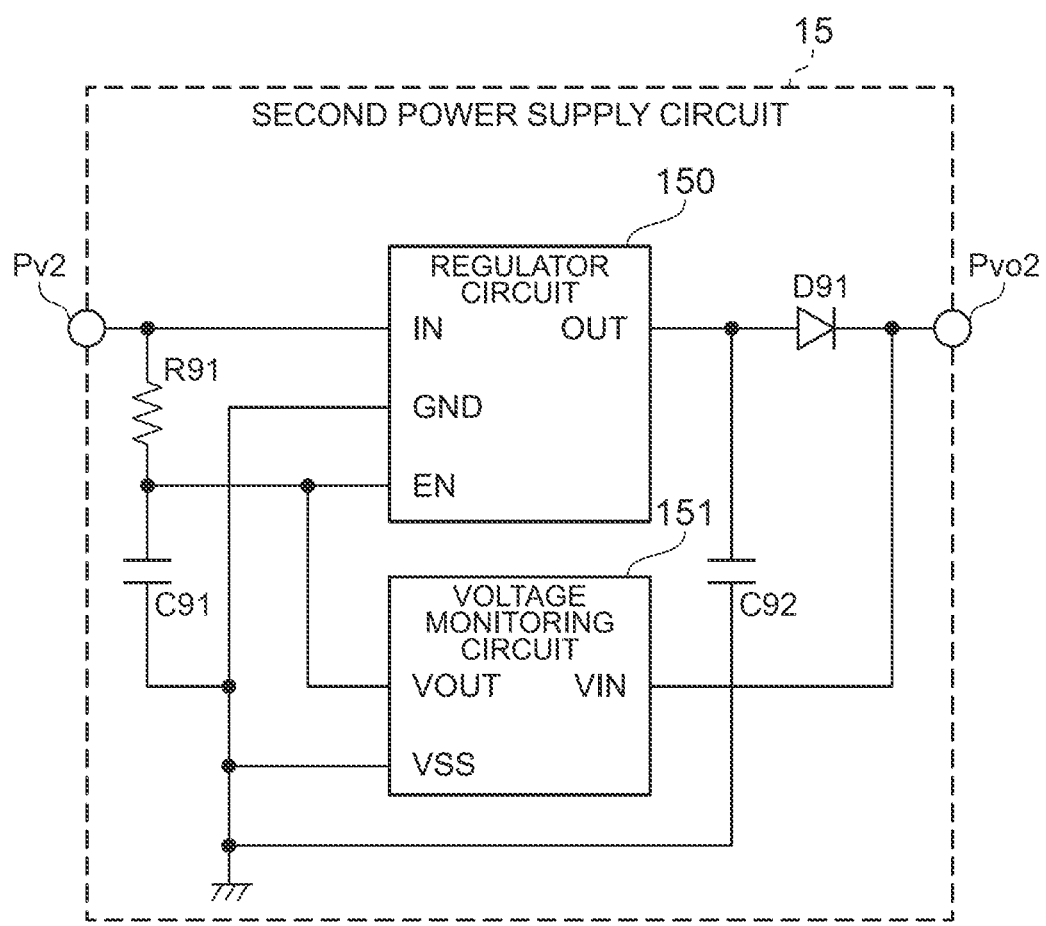
FIG. 2 is a block diagram illustrating a circuit configuration example of a second power supply circuit 15.

FIG. 2 is a block diagram illustrating a circuit configuration example of the second power supply circuit 15.

As illustrated in FIG. 2, the second power supply circuit 15 includes, for example, a regulator circuit 150, a voltage monitoring circuit 151, an input terminal Pv2 and an output terminal Pvo2.

The regulator circuit 150 is, for example, a series regulator or a switching regulator. The regulator circuit 150 steps down a DC voltage supplied to a terminal IN (drive command signal Sc as the second supply voltage), generates a second DC voltage and outputs the second DC voltage to a terminal OUT. The regulator circuit 150 is implemented, for example, as a semiconductor integrated circuit (IC) where all the circuit elements are packaged. The second DC voltage outputted from the terminal OUT of the regulator circuit 150 is outputted from the output terminal Pvo2 via a diode D91.

The regulator circuit 150 includes an enable terminal EN to control whether or not a second DC voltage can be generated. When, for example, a high level voltage is inputted to the enable terminal EN, the regulator circuit 150 is operable, generates a second DC voltage from the DC voltage (second supply voltage) supplied to the terminal IN and outputs the second DC voltage to the terminal OUT. On the other hand, when a low level voltage is inputted to the enable terminal EN, the regulator circuit 150 is disabled to operate and stops the output of the second DC voltage to the terminal OUT.

The voltage monitoring circuit 151 monitors the first DC voltage outputted from the first power supply circuit 14 and stops the operation of the regulator circuit 150 when the first DC voltage exceeds a predetermined threshold, and enables the operation of the regulator circuit 150 when the first DC voltage is lower than the predetermined threshold. The voltage monitoring circuit 151 is, for example, a voltage detector and implemented as a semiconductor integrated circuit device (IC) where all the circuit elements are packaged.

More specifically, the voltage monitoring circuit 151 includes a terminal VIN for voltage monitoring and a terminal VOUT for signal output. The terminal VIN for voltage monitoring is connected to the output terminal Pvo2 of the second power supply circuit 15 and the terminal VOUT for signal output is connected to the enable terminal EN of the regulator circuit 150. The terminal VOUT for signal output together with the enable terminal EN is also connected to the input terminal Pv2 via a resistor R91.

During normal operation, that is, when the first DC voltage is outputted from the first power supply circuit 14, a voltage to be inputted to the input terminal VIN (output terminal Pvo2) of the voltage monitoring circuit 151 becomes higher than a predetermined threshold. In this case, the voltage monitoring circuit 151 sets the output terminal VOUT to a low level. In this way, the enable terminal EN of the regulator circuit 150 is set to a low level and the regulator circuit 150 stops the voltage output.

On the other hand, when an abnormality occurs, that is, when the supply of the first supply voltage Vdc to the motor drive control device 1 is interrupted due to fuse blowout or the like, a voltage to be inputted to the terminal VIN for voltage monitoring (output terminal Pvo2) of the voltage monitoring circuit 151 becomes lower than the predetermined threshold. In this case, the voltage monitoring circuit 151 sets the terminal VOUT for signal output to a high impedance state. In this way, the enable terminal EN of the regulator circuit 150 is caused by the resistor 91 to be set to a high level and the regulator circuit 150 generates a second DC voltage from the DC voltage supplied to the terminal IN (drive command signal Sc as the second supply voltage) and outputs the second DC voltage to the output terminal Pvo2.

As described above, when the first supply voltage Vdc is supplied to the motor drive control device 1, the drive voltage generation circuit 13 supplies the first DC voltage generated based on the first supply voltage Vdc to the control circuit 21 as the drive voltage Vin, and when the first supply voltage Vdc is not supplied to the motor drive control device 1, the drive voltage generation circuit 13 supplies the second DC voltage generated based on the drive command signal Sc (PWM signal with a duty ratio of 100%) as the second supply voltage to the control circuit 21 as the drive voltage Vin.

The supply voltage detection circuit 16 is a circuit for detecting the first supply voltage Vdc. The supply voltage detection circuit 16 is implemented by a voltage-dividing resistor circuit including a plurality of resistors connected in series between, for example, the power supply line Lp and the ground potential. The supply voltage detection circuit 16 divides the first supply voltage Vdc and inputs the resulting voltage to the control circuit 21 as a power supply detection signal Sdc. In other words, the supply voltage detection circuit 16 is a circuit for converting (reducing) the first supply voltage Vdc to a voltage that can be inputted to the control circuit 21 so as to allow the control circuit 21 (e.g., microcontroller) to monitor the first supply voltage Vdc.

The input/output signal conversion circuit 17 is an interface circuit for carrying out communication between the control circuit 21 in the motor drive control device 1 and the host device 2, which is an external device. The input/output signal conversion circuit 17 is, for example, a level shift circuit configured to convert a signal level of an input signal and output the input signal. For example, the input/output signal conversion circuit 17 lowers the signal level of the drive command signal Sc inputted from the host device 2 to the input terminal P2 to a voltage that can be inputted to the control circuit 21 (e.g., microcontroller) and inputs the drive command signal Sc to the control circuit 21. The input/output signal conversion circuit 17 increases the signal level of the motor driving information signal So outputted from the control circuit 21 to a voltage recognizable by the host device 2 and outputs the motor driving information signal So from the output terminal P3.

The temperature sensor 18 is a part configured to measure a temperature around the motor 3 and the motor drive control device 1. The temperature sensor 18 includes, for example, a thermistor. The temperature sensor 18 generates a voltage corresponding to the measured temperature and inputs the voltage to the control circuit 21 as a temperature detection signal.

The current detection circuit 19 is a circuit for detecting a drive current of the motor 3. The current detection circuit 19 includes, for example, a resistor Rs. The resistor Rs is connected in series with the inverter circuit 12 between the power supply line Lp and the ground potential. The current detection circuit 19 converts a current flowing through the coils Lu, Lv and Lw of the motor 3 to a voltage by the resistor Rs and inputs the voltage to the control circuit 21 as a current detection signal.

The control circuit 21 is a circuit for integrally controlling operation of the motor drive control device 1. In the present embodiment, the control circuit 21 is a program processing device having a configuration including a processor such as a CPU, various storage devices such as a RAM, a ROM, a flash memory and peripheral circuits such as a counter (timer), an A/D conversion circuit, a D/A conversion circuit, a clock generation circuit and an input/output interface circuit, all of which are connected to each other via a bus or dedicated line, and an example of the control circuit 21 is a microcontroller (MCU: micro controller unit).

The control circuit 21 may have a configuration in which the control circuit 21 and the motor drive circuit 10 are packaged as one semiconductor integrated circuit device (IC) or a configuration in which the control circuit 21 and the motor drive circuit 10 are packaged as individual integrated circuit devices respectively.

The control circuit 21 is configured to be operable by a power supply from the drive voltage generation circuit 13. That is, the control circuit 21 operates using the drive voltage Vin as a power source. The control circuit 21 receives the drive command signal Sc outputted from the host device 2, the position detection signal Sr outputted from the position detection device 6, the power supply detection signal Sdc outputted from the supply voltage detection circuit 16, the current detection signal outputted from the current detection circuit 19 and the temperature detection signal outputted from the temperature sensor 18. The control circuit 21 performs various calculation processing and signal processing based on these input signals to thereby realize the following three main functions. To be more specific, the control circuit 21 includes a motor drive control function, a history generation storage function and a history output function.

The motor drive control function is a function to generate the drive control signal Sd to drive the motor 3, output the drive control signal Sd to the motor drive circuit 10 and thereby control the drive of the motor 3. To be more specific, the control circuit 21 generates the drive control signal Sd to drive the motor 3 based on the drive command signal Sc, the position detection signal Sr, the current detection signal outputted from the current detection circuit 19 and the temperature detection signal outputted from the temperature sensor 18, and outputs the drive control signal Sd to the motor drive circuit 10. For example, when the drive command signal Sc is inputted to the input terminal P2, the control circuit 21 generates the drive control signal Sd so that the motor 3 rotates at a target rotational speed specified by the duty ratio of the drive command signal Sc, generates the rotational speed signal corresponding to the actual rotational speed of the motor 3, and outputs the rotational speed signal to the output terminal P3 as the motor driving information signal So.

The history generation storage function is a function to generate and internally store the history information 300 based on various monitoring information. More specifically, the control circuit 21 generates the history information 300 such as cumulative information 301, operation state information 302 and abnormality detection information 303 based on the drive voltage Vin, the drive command signal Sc and the position detection signal Sr, which is monitoring information, the current detection signal outputted from the current detection circuit 19, the temperature detection signal outputted from the temperature sensor 18, the power supply detection signal Sdc outputted from the supply voltage detection circuit 16 as appropriate, and stores the information in the control circuit 21.

The history output function is a function to monitor a supply state of the first supply voltage Vdc, which is the main power source of the motor drive control device 1 and output the stored history information 300 to an external device (e.g., host device 2) when the supply of the first supply voltage Vdc is stopped. To be more specific, the control circuit 21 monitors the first supply voltage Vdc based on the power supply detection signal Sdc and switches the motor driving information signal So to be outputted from the output terminal P3 from the rotational speed signal to the history information 300 upon detecting that the supply of the first supply voltage Vdc is stopped.

Hereinafter, a functional block configuration of the control circuit 21 to implement the aforementioned respective functions will be described more specifically with reference to the accompanying drawings.

Figure 3:
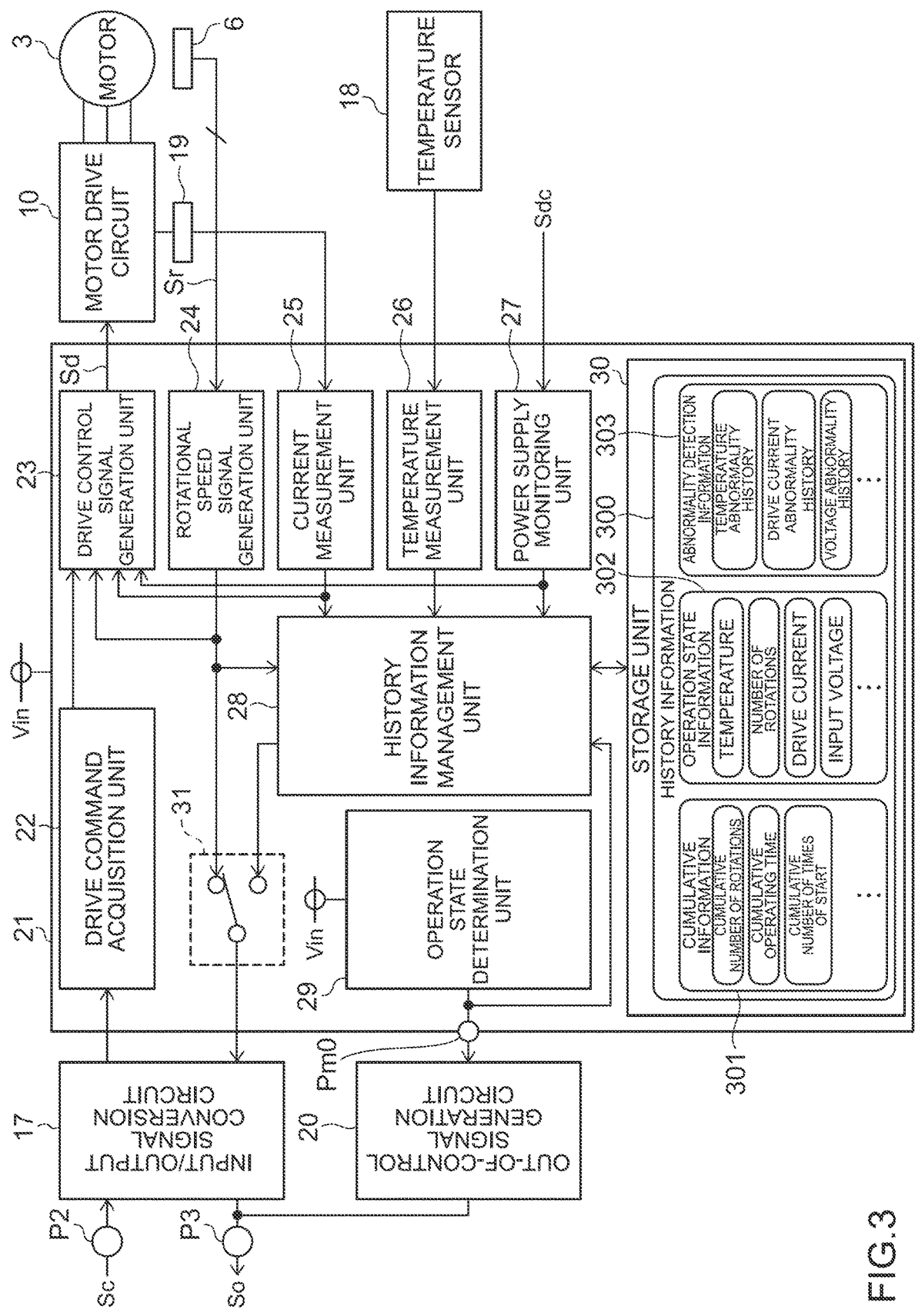
FIG. 3 is a block diagram illustrating an internal configuration example of a control circuit 21.

FIG. 3 is a block diagram illustrating an internal configuration example of the control circuit 21.

As illustrated in FIG. 3, the control circuit 21 includes a drive command acquisition unit 22, a drive control signal generation unit 23, a rotational speed signal generation unit 24, a current measurement unit 25, a temperature measurement unit 26, a power supply monitoring unit 27, a history information management unit 28, an operation state determination unit 29, a storage unit 30 and an output switching unit 31 as functional blocks to implement the aforementioned respective functions. These functional blocks are implemented by the CPU in the aforementioned MCU executing various calculation processing according to a program stored in the memory and controlling peripheral circuits such as the A/D conversion circuit and the input/output interface circuit based on the processing results.

The drive command acquisition unit 22 is a functional unit to acquire an instruction content from the drive command signal Sc outputted from the host device 2. For example, the drive command acquisition unit 22 analyzes a duty ratio of a PWM signal, which is the drive command signal Sc, thereby acquires information on the target rotational speed of the motor 3 specified from the host device 2 and provides the information to the drive control signal generation unit 23.

The drive control signal generation unit 23 generates the drive control signal Sd as a PWM signal based on the target rotational speed given from the drive command acquisition unit 22, the rotational speed signal generated by the rotational speed signal generation unit 24, the measured value of the drive current of the motor 3 measured by the current measurement unit 25 and the voltage value of the first supply voltage Vdc detected by the power supply monitoring unit 27. For example, the drive control signal generation unit 23 generates a PWM signal, a duty ratio of which is adjusted so that the motor 3 rotates at the target rotational speed specified by the drive command signal Sc and outputs the PWM signal to the motor drive circuit 10 as the drive control signal Sd.

The rotational speed signal generation unit 24 is a functional unit to generate a rotational speed signal (FG signal) with a frequency corresponding to the rotational speed of the motor 3 based on the position detection signal Sr outputted from the position detection device 6. For example, the rotational speed signal generation unit 24 generates a rotational speed signal (FG signal) by synthesizing 3-phase Hall signals as the position detection signal Sr. The rotational speed signal (FG signal) is, for example, a signal with a predetermined duty ratio, and more specifically, a pulse signal with a duty ratio of approximately 50%.

The output switching unit 31 is a functional unit to switch a signal to be outputted from the control circuit 21. The output switching unit 31 selects any one of the rotational speed signal (FG signal) generated by the rotational speed signal generation unit 24 and the history information 300, which will be described later, and outputs the signal to the output terminal P3 via the input/output signal conversion circuit 17 as the motor driving information signal So. During normal operation while the motor 3 and the motor drive control device 1 are operating normally, the output switching unit 31 is set so as to select the rotational speed signal (FG signal) generated by the rotational speed signal generation unit 24 and output the rotational speed signal as the motor driving information signal So. The output switching unit 31 selects the history information 300 under the control from the history information management unit 28, which will be described later, and outputs the history information 300 as the motor driving information signal So.

The current measurement unit 25 is a functional unit that measures drive currents of the motor 3 (currents flowing through the coils Lu, Lv and Lw) based on the current detection signal detected by the current detection circuit 19 and outputs the measured values. The temperature measurement unit 26 is a functional unit that measures a temperature based on the temperature detection signal detected by the temperature sensor 18 and outputs the measured value. The current measurement unit 25 and the temperature measurement unit 26 can be implemented by, for example, the current detection circuit 19 and an A/D conversion circuit that converts a voltage outputted from the temperature sensor 18 to a digital signal.

The power supply monitoring unit 27 is a functional unit that monitors a supply state of the first supply voltage Vdc based on the power supply detection signal Sdc outputted from the supply voltage detection circuit 16. When the DC voltage as the power supply detection signal Sdc exceeds a predetermined threshold, the power supply monitoring unit 27 determines that the first supply voltage Vdc is supplied to the power supply line Lp and outputs the voltage value of the detected first supply voltage Vdc to the history information management unit 28 and the drive control signal generation unit 23. When the DC voltage as the power supply detection signal Sdc does not exceed a predetermined threshold, the power supply monitoring unit 27 determines that the first supply voltage Vdc is not supplied to the power supply line Lp and outputs information indicating that the first supply voltage Vdc is lost to the history information management unit 28 and the drive control signal generation unit 23. The power supply monitoring unit 27 can be implemented by, for example, an A/D conversion circuit that converts a DC voltage as the power supply detection signal Sdc to a digital signal and a comparison unit that compares the voltage value converted to a digital signal with a threshold. The comparison unit is implemented by program processing of the CPU.

The operation state determination unit 29 is a functional unit that determines whether or not the control circuit 21 can operate normally. For example, while a drive voltage Vin is supplied to the control circuit 21, the operation state determination unit 29 determines that the control circuit 21 can operate normally and sets a terminal Pm0 of the control circuit 21 (e.g., output pin of the microcontroller) to a high level (e.g., drive voltage Vin). On the other hand, for example, when the drive voltage Vin is not supplied to the control circuit 21, the operation state determination unit 29 sets the terminal Pm0 to a high impedance state.

The history information management unit 28 is a functional unit that generates the history information 300 relating to operation of the motor, stores the history information 300 in the storage unit 30, reads the history information 300 from the storage unit 30 as required and outputs the history information 300 to an external device (host device 2).

The storage unit 30 is a functional unit to store the history information 300 generated by the history information management unit 28. In addition to the history information 300, the storage unit 30 also stores parameters or the like necessary for various data processing to implement the respective functions of the aforementioned control circuit 21. The storage unit 30 is implemented by a storage region of a non-volatile storage device such as a flash memory, and so the aforementioned history information 300 or various parameters are never lost even when the power source of the motor drive control device 1 is in an off state.

The history information management unit 28 generates, for example, cumulative information 301, operation state information 302 and abnormality detection information 303 as the history information 300.

The cumulative information 301 is information indicating an extent to which the motor 3 has been used. The cumulative information 301 includes, for example, at least one of the cumulative number of rotations, cumulative operation time, and cumulative number of times of start of the motor 3.

The history information management unit 28 calculates the number of rotations of the motor 3 per unit time of the motor 3 based on, for example, an FG signal generated by the rotational speed signal generation unit 24, accumulates the numbers of rotations to thereby calculate the cumulative number of rotations of the motor 3 and stores the cumulative number of rotations of the motor 3 in the storage unit 30. The history information management unit 28 measures and accumulates an operation time for each rotational speed of the motor 3, calculates a cumulative operation time of the motor 3 based on the operation time for each accumulated rotational speed and stores the cumulative operation time in the storage unit 30. Furthermore, the history information management unit 28 counts the number of times the drive voltage Vin is applied based on, for example, the determination result by the operation state determination unit 29, accumulates the numbers of times as the cumulative number of times of start of the motor 3 and stores the accumulated number in the storage unit 30.

The operation state information 302 is information indicating an operation state of the motor 3. The operation state information 302 includes, for example, at least one piece of information indicating a temperature around the motor, a drive current of the motor 3, the number of rotations of the motor 3 and the drive voltage Vin.

The history information management unit 28 stores temperature measurement results by the temperature measurement unit 26 in the storage unit 30 every unit time. The history information management unit 28 stores the numbers of rotations (rotational speed) per unit time based on the FG signal in the storage unit 30. The history information management unit 28 stores the drive current measurement results of the motor 3 by the current measurement unit 25 in the storage unit 30 every unit time. The history information management unit 28 also stores drive voltage Vin values in the storage unit 30, for example, every unit time.

The abnormality detection information 303 is information indicating a content of an abnormality generated in the motor drive control device 1 or the motor 3. The abnormality detection information 303 includes at least one piece of information of a temperature abnormality history indicating that an abnormal temperature has been detected, a drive current abnormality history indicating that a drive current of the motor 3 has an abnormal value (e.g., overcurrent) and a voltage abnormality history indicating that the voltage (first supply voltage Vdc) or the drive voltage Vin of the motor 3 has become an abnormal value.

For example, when the temperature measured by the temperature measurement unit 26 exceeds a predetermined threshold, the history information management unit 28 stores the fact that the temperature around the motor 3 has become abnormal in the storage unit 30 as a temperature abnormality history. For example, when the drive current of the motor 3 measured by the current measurement unit 25 exceeds the predetermined threshold, the history information management unit 28 stores the fact that an overcurrent has been generated in the storage unit 30 as a drive current abnormality history. For example, when the power supply monitoring unit 27 detects that the supply of the first supply voltage Vdc is stopped, the history information management unit 28 stores the fact that the first supply voltage Vdc has been interrupted in the storage unit 30 as a voltage abnormality history and when the drive voltage Vin exceeds a predetermined threshold, the history information management unit 28 stores the fact that the drive voltage Vin has become an overvoltage in the storage unit 30 as a voltage abnormality history.

The history information management unit 28 causes the history information 300 to be outputted from the output terminal P3 by controlling the output switching unit 31. More specifically, when an abnormality is generated in the motor 3 and the motor drive control device 1, the history information management unit 28 controls the output switching unit 31 to switch the signal to be outputted from the output terminal P3 as the motor driving information signal So from the rotational speed signal (FG signal) to the history information 300. For example, when the power supply monitoring unit 27 detects that the supply of the first supply voltage Vdc is stopped, the history information management unit 28 determines that an abnormality has occurred, reads the history information 300 from the storage unit 30 and controls the output switching unit 31 to cause the history information 300 to be outputted from the output terminal P3 as the motor driving information signal So.

When the control circuit 21 is out of control, the out-of-control signal generation circuit 20 is a circuit that outputs an out-of-control signal indicating that the control circuit 21 is out of control to the output terminal P3 as the motor driving information signal So. To be more specific, the out-of-control signal generation circuit 20 controls whether or not the control circuit 21 can be operated according to the state of the terminal Pm0 of the control circuit 21. As described above, when the control circuit 21 can be operated normally, the operation state determination unit 29 sets the terminal Pm0 of the control circuit 21 to a high level, and when the control circuit 21 cannot be operated normally, the operation state determination unit 29 sets the terminal Pm0 of the control circuit 21 to a high impedance state. For example, when the terminal Pm0 of the control circuit 21 is set to a high level voltage (e.g., Vin), the out-of-control signal generation circuit 20 determines that the control circuit 21 is in a control operation enabled state (operable state) and does not output any out-of-control signal. On the other hand, when the terminal Pm0 of the control circuit 21 is in a high impedance state, the out-of-control signal generation circuit 20 determines that the control circuit 21 is out of control and outputs an out-of-control signal to the output terminal P3. The out-of-control signal is outputted from the output terminal P3 to the host device 2 as the motor driving information signal So.

Figure 4:
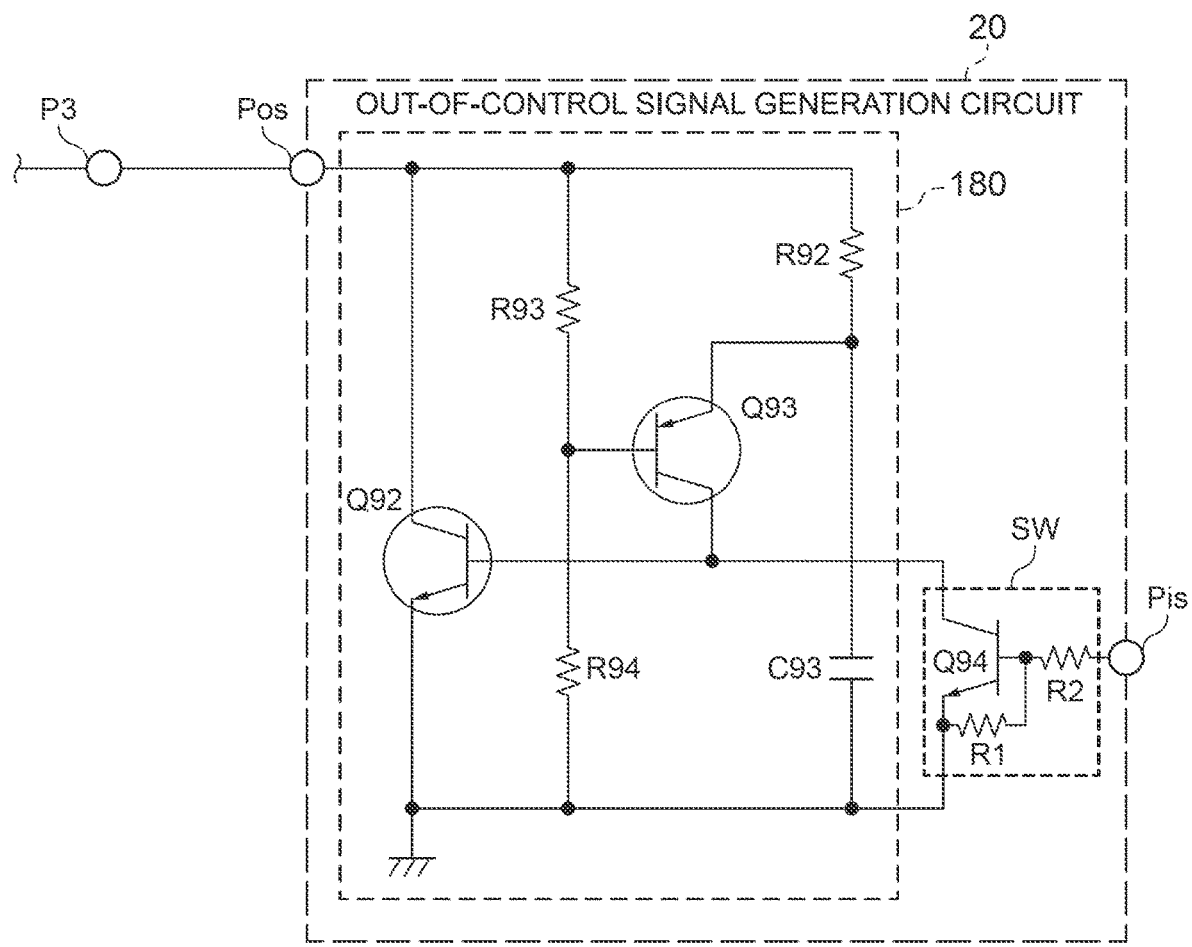
FIG. 4 is a diagram illustrating a circuit configuration example of an out-of-control signal generation circuit 20.

FIG. 4 is a diagram illustrating a circuit configuration example of the out-of-control signal generation circuit 20.

The out-of-control signal generation circuit 20 is, for example, an oscillator. More specifically, as illustrated in FIG. 4, the out-of-control signal generation circuit 20 is provided with a signal output terminal Pos, an enable terminal Pis and a switch SW and an oscillation circuit 180. The signal output terminal Pos is connected to the output terminal P3 of the motor drive control device 1. Note that the external terminal of the host device 2 connected to the signal output terminal Pos (output terminal P3) is pulled up inside the host device 2. The enable terminal Pis is connected to the terminal Pm0 of the control circuit 21.

The oscillation circuit 180 includes a transistor (e.g., NPN transistor) Q92, a transistor (e.g., PNP transistor) Q93, resistors R92 to R94 and a capacitor C93. A collector electrode of the transistor Q92 is connected to the signal output terminal Pos and an emitter electrode of the transistor Q92 is connected to a ground potential. The resistor R93 and the resistor R94 are connected in series between the signal output terminal Pos and the ground potential. One terminal of the resistor R92 is connected to the signal output terminal Pos.

One terminal of the capacitor C93 is connected to another terminal of the resistor R92 and another terminal of the capacitor C93 is connected to the ground potential. A base electrode of the transistor Q93 is connected to a node at which the resistor R93 and the resistor R94 are connected, and a collector electrode of the transistor Q93 is connected to a base electrode of the transistor Q92. An emitter electrode of the transistor Q93 is connected to a node at which the resistor R92 and the capacitor C93 are connected.

The switch SW is set in an on-state when the enable terminal Pis is at a high level to set the oscillation circuit 180 in an inoperable (disabled) state or is set in an off-state when the enable terminal Pis is in a high impedance state causing the oscillation circuit 180 to be set in an operable (enabled) state. The switch SW includes, for example, a transistor (e.g., NPN transistor) Q94 and resistors R1 and R2. A collector electrode of the transistor Q94 is connected to the base electrode of the transistor Q92, the collector electrode of the transistor Q93, an emitter electrode of the transistor Q94 is connected to the ground potential. One terminal of the resistor R2 is connected to the enable terminal Pis, another terminal of the resistor R2 is connected to a base electrode of the transistor Q94. One terminal of the resistor R1 is connected to the base electrode of the transistor Q94 and another terminal of the resistor R1 is connected to the ground potential.

According to the circuit configuration illustrated in FIG. 4, when the control circuit 21 is in an operable state, that is, when the terminal Pm0 of the control circuit 21 connected to the enable terminal Pis is at a high level (e.g., Vin), the transistor Q94 is turned on and the transistor Q92 is turned off. In this way, the oscillation circuit 180 stops oscillation operation and the signal output terminal Pos has a voltage corresponding to the other circuits (the host device 2 and the input/output signal conversion circuit 17) connected to the output terminal P3.

On the other hand, when the control circuit 21 is out of control, that is, when the terminal Pm0 of the control circuit 21 connected to the enable terminal Pis is in a high impedance state, the transistor Q94 is turned off due to pull-down of the resistor R1. In this way, the oscillation circuit 180 can perform oscillation operation, the oscillation circuit 180 generates a signal, a voltage of which periodically changes (cycle signal) and outputs the signal from the signal output terminal Pos as an out-of-control signal. The out-of-control signal is inputted from the output terminal P3 of the motor drive control device 1 to the host device 2 as the motor driving information signal So.

Here, the out-of-control signal outputted from the oscillation circuit 180 as a cycle signal preferably has a duty ratio different from the duty ratio of the rotational speed signal (pulse signal) to be outputted as the motor driving information signal So from the output terminal P3 when the motor drive control device 1 and the motor 3 are operating normally. For example, when the rotational speed signal is a pulse signal with a duty ratio of approximately 50%, it is preferable to set circuit parameters (values of the resistors R92 to R94, and the capacitor C93) of the oscillation circuit 180 so that the duty ratio of the out-of-control signal takes a value other than 50% (e.g., duty ratio of 10 to 30% or 70% to 90%).

According to this, even when a rotational speed signal (pulse signal) and an out-of-control signal are switched and outputted from the one output terminal P3 as the motor driving information signal So as in the case of the present embodiment, the host device 2 can recognize and distinguish between the rotational speed signal (pulse signal) and the out-of-control signal based on the duty ratio of the motor driving information signal So.

Figure 5A:
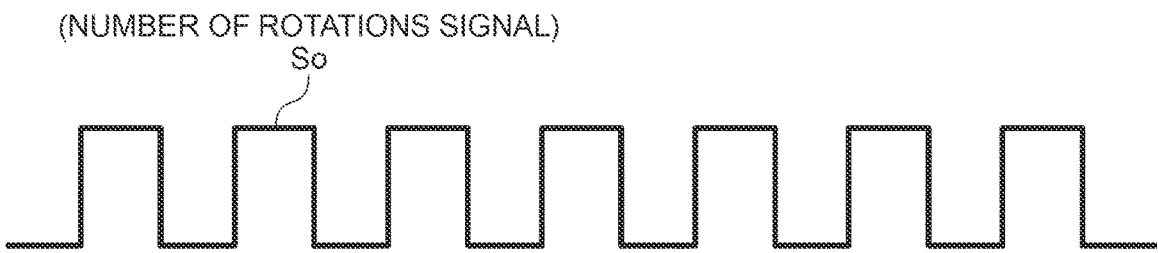
FIG. 5A is a diagram illustrating an example of a motor driving information signal So (rotational speed signal) outputted from an output terminal P3 of the motor drive control device 1.
Figure 5B:
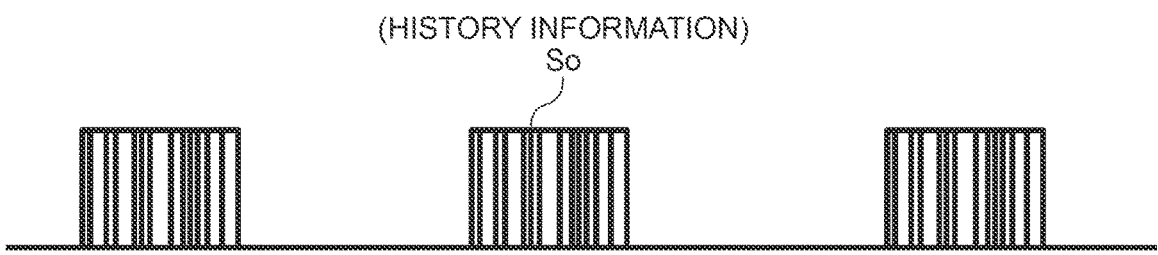
FIG. 5B is a diagram illustrating an example of a motor driving information signal So (history information) outputted from the output terminal P3 of the motor drive control device 1.
Figure 5C:
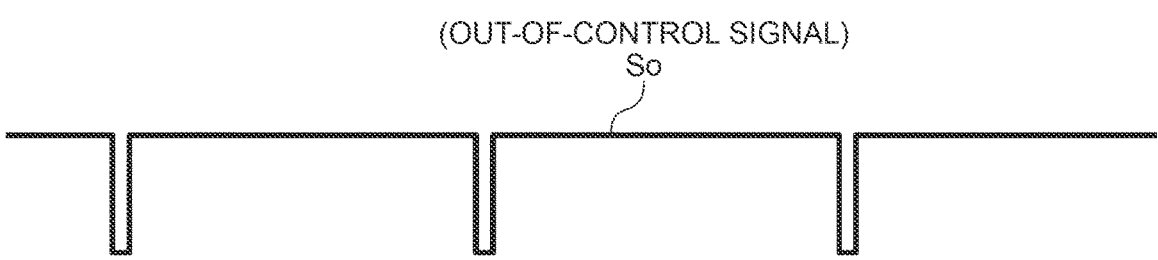
FIG. 5C is a diagram illustrating an example of a motor driving information signal So (out-of-control signal) outputted from the output terminal P3 of the motor drive control device 1.

FIG. 5A to FIG. 5C are diagrams illustrating examples of the motor driving information signal So outputted from the output terminal P3 of the motor drive control device 1.

FIG. 5A illustrates an example of the motor driving information signal So when the motor 3 and the motor drive control device 1 are operating normally (during normal operation). FIG. 5B illustrates an example of the motor driving information signal So when the first supply voltage Vdc is lost, for example, when a fuse as the power interruption circuit 8 is blown due to an overcurrent. FIG. 5C illustrates an example of the motor driving information signal So when the control circuit 21 is out of control, for example, when the supply of the drive voltage Vin to the control circuit 21 is stopped.

During normal operation, the motor 3 rotates at a target rotational speed specified from the host device 2, and so the control circuit 21 (rotational speed signal generation unit 24) generates a rotational speed signal (FG signal). At this time, since the control circuit 21 is enabled to operate normally, the terminal Pm0 of the control circuit 21 connected to the out-of-control signal generation circuit 20 (oscillation circuit) is set to a high level. Therefore, the out-of-control signal generation circuit 20 (oscillation circuit) stops the oscillation operation and does not output any signal to the output terminal P3. Therefore, when the motor 3 and the motor drive control device 1 are operating normally (during normal operation), a rotational speed signal (FG signal) is outputted from the output terminal P3 as the motor driving information signal So as illustrated in FIG. 5A.

When the first supply voltage Vdc is lost, the rotation of the motor 3 is stopped, and the first power supply circuit 14 cannot generate any input voltage Vin. At this time, a drive command signal Sc with a duty ratio of 100% is inputted from the host device 2 to the motor drive control device 1, and the second power supply circuit 15 generates the drive voltage Vin using the drive command signal Sc as the second supply voltage. In this way, the control circuit 21 is enabled to operate even when the first supply voltage Vdc is lost, and the terminal Pm0 of the control circuit 21 is set to a high level. This causes the out-of-control signal generation circuit 20 (oscillation circuit) to stop the oscillation operation and does not output any signal to the output terminal P3. On the other hand, the control circuit 21 stops the output of the rotational speed signal and outputs the history information 300 read from the storage unit 30. Therefore, when the first supply voltage Vdc is lost, as illustrated in FIG. 5B, the history information 300 is outputted from the output terminal P3 as the motor driving information signal So. At this time, the control circuit 21 outputs, for example, the history information 300 as a serial signal.

When the control circuit 21 is out of control, the control circuit 21 can output neither rotational speed signal (FG signal) nor history information 300, and the terminal Pm0 of the control circuit 21 is in a high impedance state. Thus, the out-of-control signal generation circuit 20 (oscillation circuit) is enabled to perform oscillation operation and outputs the out-of-control signal to the output terminal P3. Therefore, when the control circuit 21 is out of control, as illustrated in FIG. 5C, the out-of-control signal is outputted from the motor drive control device 1 to the host device 2 as the motor driving information signal So. Here, the out-of-control signal (cycle signal) is, for example, a cycle signal with a duty ratio different from the duty ratio of the rotational speed signal (FG signal) during normal operation.

Next, operation of the motor drive control system 100 according to the present embodiment will be described using the accompanying drawings.

Figure 6:
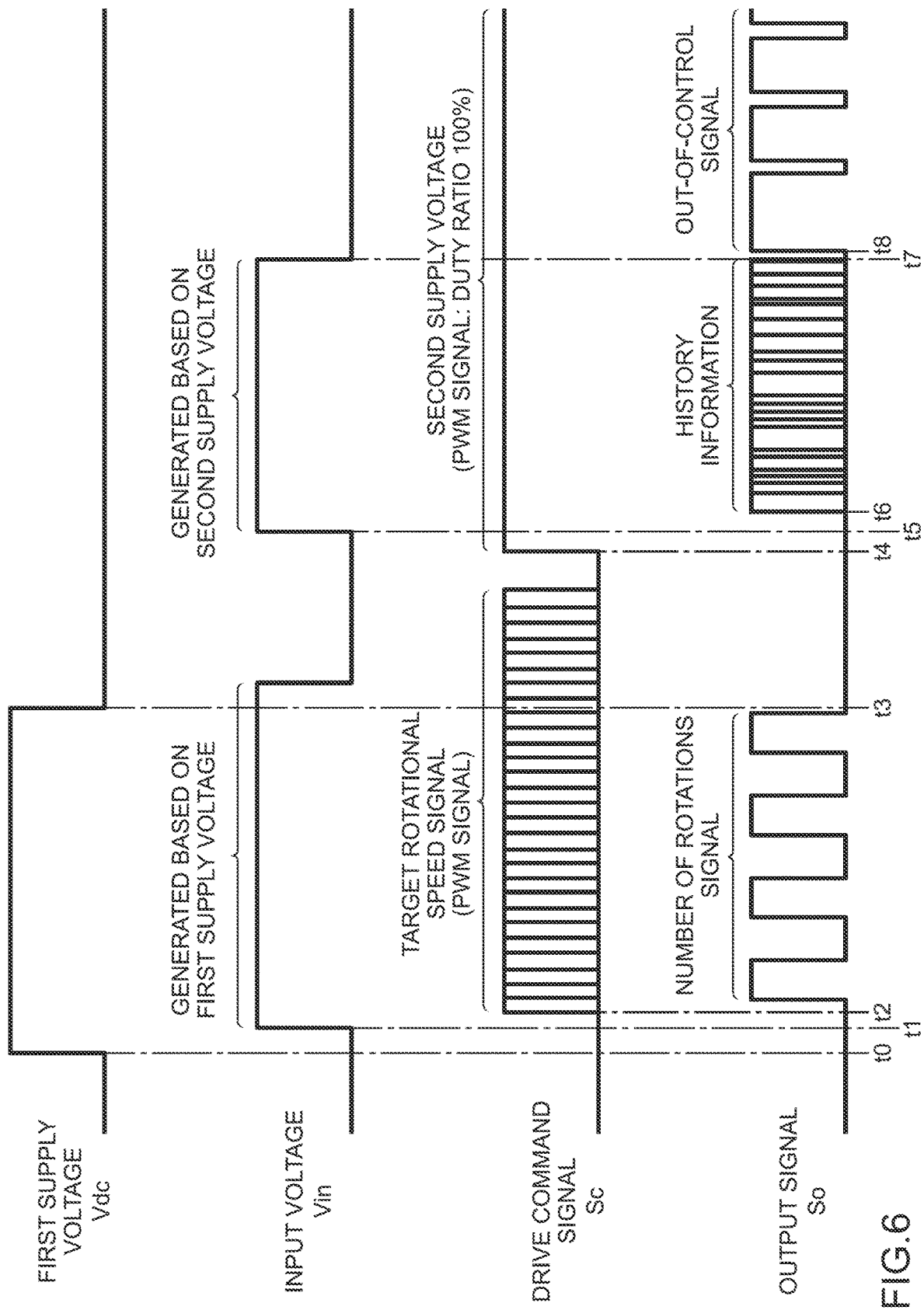
FIG. 6 is a timing chart illustrating main voltages and signals of the motor drive control system 100.
Figure 7A:
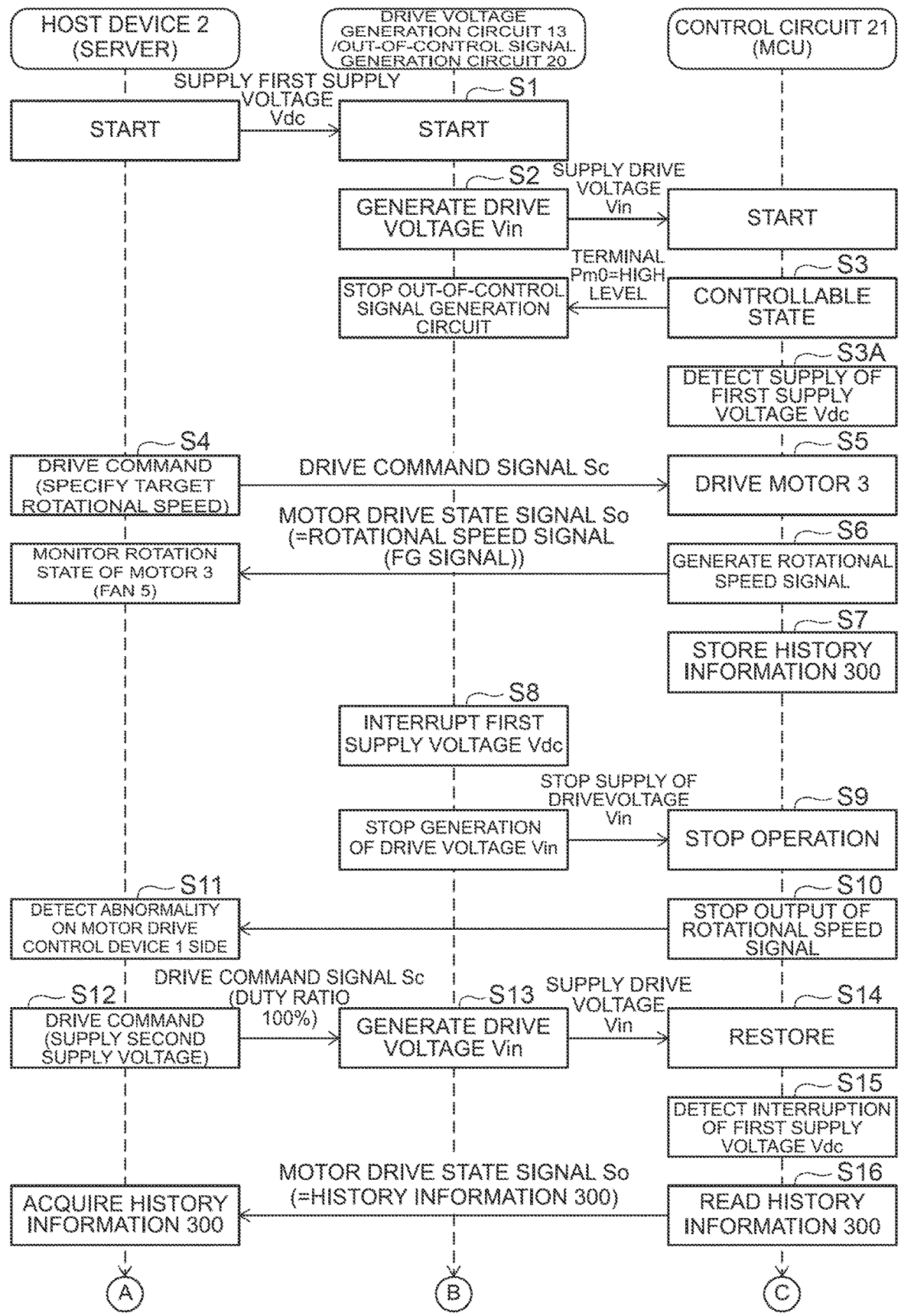
FIG. 7A is a sequence diagram illustrating a processing flow by the motor drive control system 100.
Figure 7B:
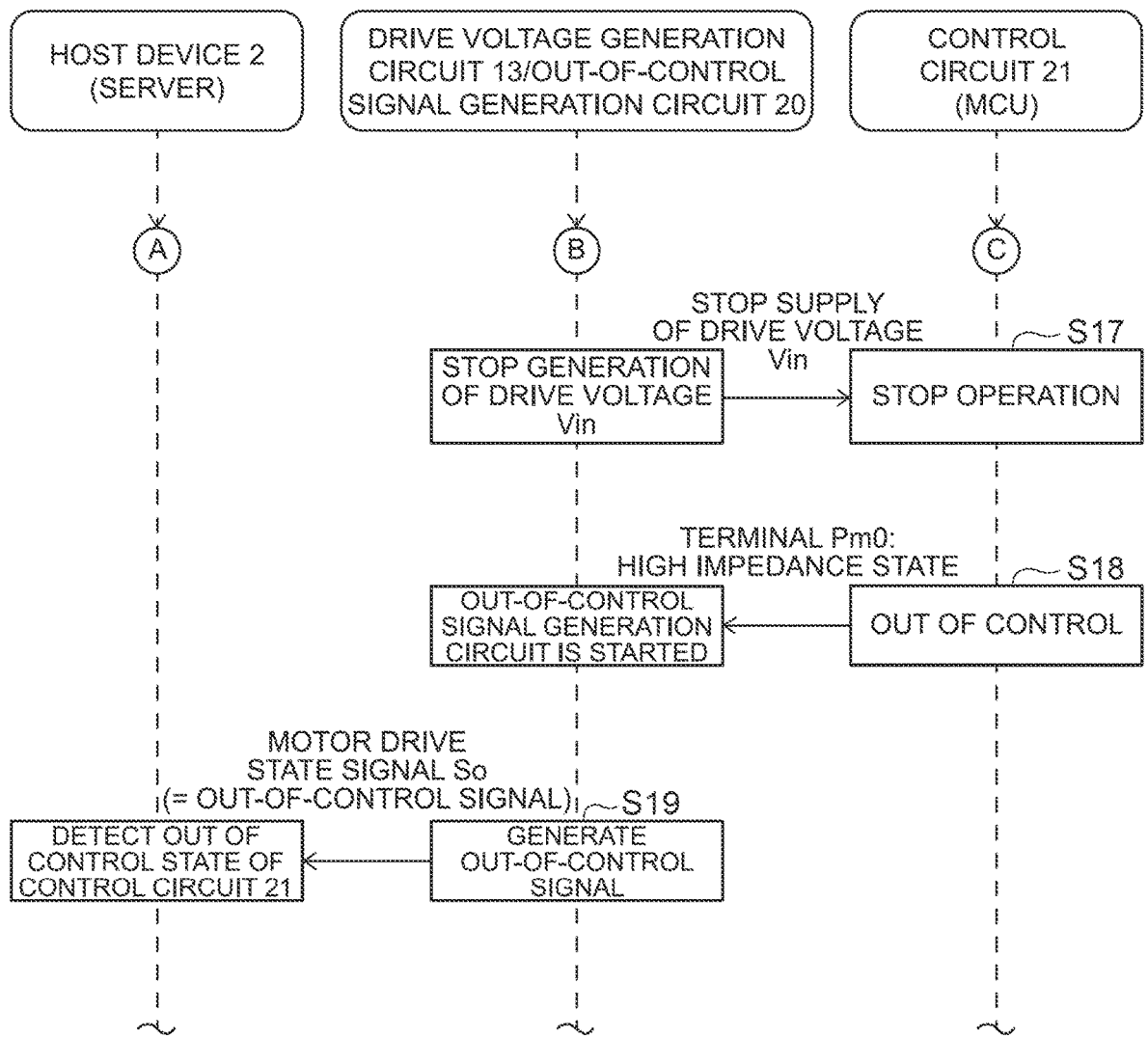
FIG. 7B is a sequence diagram illustrating a processing flow by the motor drive control system 100.

FIG. 6 is a timing chart illustrating main voltages and signals of the motor drive control system 100. FIG. 7A and FIG. 7B are sequence diagrams illustrating a processing flow by the motor drive control system 100.

For example, when an information processing device (host device 2) such as a server equipped with the motor drive control system 100 including the fan 5 is activated, the first supply voltage Vdc is supplied to the power supply terminal P1 of the motor drive control device 1 and the drive voltage generation circuit 13 of the motor drive control device 1 is activated (step S1). More specifically, at time t0 in FIG. 6, the first supply voltage Vdc is supplied to the power supply line Lp in the motor drive control device 1 and the drive voltage generation circuit 13 is thereby activated.

Thereafter, for example, at time t1 in FIG. 6, the drive voltage generation circuit 13 generates the drive voltage Vin from the first supply voltage Vdc by the first power supply circuit 14 and supplies the drive voltage Vin to the control circuit 21 (step S2). The control circuit 21 is thereby activated.

The activated control circuit 21 receives the drive voltage Vin and is enabled to perform control and causes the operation state determination unit 29 to set the terminal Pm0 to a high level. The oscillation operation of the out-of-control signal generation circuit 20 is thereby stopped and the rotational speed signal or history information 300 can be outputted from the output terminal P3 of the motor drive control device 1 as the motor driving information signal So (step S3). At this time, the power supply monitoring unit 27 of the control circuit 21 detects that the first supply voltage Vdc is supplied (step S3A). In response to detection of a supply of the first supply voltage Vdc by the power supply monitoring unit 27, the history information management unit 28 switches the output switching unit 31 so as to output the rotational speed signal instead of the history information 300 from the output terminal P3.

Thereafter, a program processing unit (CPU) in the server as the host device 2 issues a command to the motor drive control device 1 so as to rotate the motor 3 (fan 5) at an appropriate rotational speed corresponding to the operation state of the server (step S4). More specifically, at time t2 illustrated in FIG. 6, the host device 2 generates a PWM signal with a duty ratio corresponding to the target rotational speed and inputs the PWM signal to the input terminal P2 of the motor drive control device 1 as the drive command signal Sc.

When the motor drive control device 1 receives the drive command signal Sc, the control circuit 21 generates the drive control signal Sd and outputs the drive control signal Sd to the motor drive circuit 10 so that the motor rotates at the target rotational speed specified by the drive command signal Sc. The motor drive circuit 10 rotates the motor 3 based on the drive control signal Sd (step S5). When the motor 3 starts rotating, as illustrated in FIG. 6, the rotational speed signal generation unit 24 in the control circuit 21 generates a rotational speed signal (FG signal) based on the Hall signal from the position detection device 6 and the output switching unit 31 outputs the rotational speed signal from the output terminal P3 to the host device 2 (step S6). This allows the host device 2 to know the rotation state of the motor 3.

At this time, the history information management unit 28 in the control circuit 21 generates the history information 300 based on the drive voltage Vin, the drive command signal Sc, the position detection signal Sr, the current detection signal outputted from the current detection circuit 19, the temperature detection signal outputted from the temperature sensor 18 and the power supply detection signal Sdc outputted from the supply voltage detection circuit 16, and stores the history information 300 in the storage unit 30 (step S7).

Note that when the rotational speed of the fan 5 is changed according to the state of the system (server), the host device 2 newly transmits a drive command signal Sc with the changed duty ratio. In this case, the motor drive control device 1 adjusts the rotational speed of the motor 3 using a technique similar to the above-described technique based on the changed drive command signal Sc.

After that, suppose that, for example, at time t3 in FIG. 6, an overcurrent is generated at the motor 3 for some reason, the fuse as the power interruption circuit 8 is blown and the supply of the first supply voltage Vdc to the motor drive control device 1 is stopped (step S8).

At this time, since the drive command signal Sc with a duty ratio corresponding to the target rotational speed is inputted to the input terminal P2 of the motor drive control device 1 from the host device 2, the drive voltage generation circuit 13 cannot generate an appropriate drive voltage Vin using the drive command signal Sc as the second supply voltage. Therefore, no appropriate drive voltage Vin is generated, and the control circuit 21 stops the operation (step S9). The output of the rotational speed signal from the control circuit 21 is thereby stopped (step S10).

Despite the fact that the host device 2 has outputted the drive command signal Sc, if the host device 2 detects that the rotational speed signal has not been inputted, it is determined that an abnormality has occurred on the motor drive control device 1 side (step S11). Thereafter, the host device 2 stops the normal output of the drive command signal Sc and newly outputs a PWM signal (DC signal) with a duty ratio of 100% as a drive command signal Sc, for example, at time t4 in FIG. 6 (step S12).

The drive voltage generation circuit 13 of the motor drive control device 1 that has received the drive command signal Sc with a duty ratio of 100% generates a drive voltage Vin using the drive command signal Sc as the second supply voltage instead of the lost first supply voltage Vdc at time t5 in FIG. 6 and supplies the drive voltage Vin to the control circuit 21 (step S13). In this way, the control circuit 21 is restored to the operable state (step S14). Note that at this time, since the first supply voltage Vdc has not been supplied to the motor 3, the motor 3 still cannot be driven.

In the restored control circuit 21, the power supply monitoring unit 27 detects that the first supply voltage Vdc has not been supplied (step S15). By controlling the output switching unit 31 according to the detection result of the power supply monitoring unit 27, the history information management unit 28 reads the history information 300 from the storage unit 30, for example, at time t6 in FIG. 6, converts the history information 300 to, for example, a serial signal and outputs the history information 300 from the output terminal P3 to the host device 2 as the motor driving information signal So (step S16). In this way, the host device 2 can know an operation history of the motor 3 before the generation of the abnormality (before interruption of the first supply voltage Vdc).

After that, at time t7, suppose that the supply of the drive voltage Vin is stopped for some reason and the operation of the control circuit 21 is stopped (step S17). In this case, the control circuit 21 is in an inoperable state, that is, an out-of-control state (step S18). This causes the terminal Pm0 of the control circuit 21 to be set in a high impedance state, thus enabling the oscillation operation of the out-of-control signal generation circuit 20. For example, at time t8, the out-of-control signal generation circuit 20 outputs an out-of-control signal from the output terminal P3 to the host device 2 as the motor driving information signal So (step S19). This allows the host device 2 to know that the control circuit 21 of the motor drive control device 1 is out of control.

As described so far, the motor drive control device 1 according to the present embodiment is provided with the drive voltage generation circuit 13 configured to generate the drive voltage Vin to drive the control circuit 21 based on the first supply voltage Vdc inputted to the power supply terminal P1 and generate the drive voltage Vin based on the second supply voltage inputted to the input terminal P2 when the supply of the first supply voltage Vdc is stopped.

According to this, as described above, even when the fuse is blown due to, for example, generation of an overcurrent and the supply of the first supply voltage Vdc as the main power source to the motor drive control device 1 is interrupted, it is possible to generate the drive voltage Vin based on the second supply voltage different from the first supply voltage Vdc, and it is thereby possible to set the control circuit 21 in an operable state.

When the control circuit 21 detects that the supply of the first supply voltage Vdc is stopped, the control circuit 21 outputs the history information 300 relating to the drive of the motor 3 (fan 5) stored in the control circuit 21 from the output terminal P3 as the motor driving information signal So.

According to this, even in a situation where the supply of the first supply voltage Vdc, which is the main power source, is stopped and the motor 3 cannot be driven, the external device such as the host device 2 can acquire the history information 300 from the control circuit 21.

In this way, according to the motor drive control device 1 of the present embodiment, even when the power supply path to the motor 3 is interrupted, the history information relating to the operation of the motor 3 can be outputted to the outside, and so the user can easily identify the cause of the abnormality generated in the motor 3 (fan 5). It is thereby possible to expect that the time to solve the problem with the motor drive control device 1 will be shortened.

The input terminal P2 is a terminal to input the drive command signal Sc including a command relating to the drive of the motor and if the first supply voltage Vdc is supplied, the control circuit 21 generates the drive control signal Sd based on the drive command signal Sc. On the other hand, when the supply of the first supply voltage Vdc is stopped and the drive command signal Sc with a duty ratio of 100% is inputted to the input terminal P2, the drive voltage generation circuit 13 generates the drive voltage Vin using the drive command signal Sc as the second supply voltage.

According to this, it is not necessary to separately provide an external terminal to input the second supply voltage, and it is thereby possible to suppress the manufacturing cost of the motor drive control device 1 accompanying power redundancy. Using the drive control signal Sd with a duty ratio of 100% outputted from the host device 2 as the second supply voltage eliminates the need to separately provide a power supply device to generate the second supply voltage, and it is thereby possible to simplify the configuration of the motor drive control system 100.

Note that when the first supply voltage Vdc is interrupted, it is only necessary that power enough for the control circuit 21 to read the history information 300 from the storage unit 30 and output the history information 300 to the outside be supplied to the control circuit 21, and large power to drive the motor 3 is unnecessary. That is, the second supply voltage need not have power capacity equivalent to the power capacity of the first supply voltage Vdc. Therefore, even the drive command signal Sc outputted from the host device 2 can be sufficiently used as the second power source.

The control circuit 21 outputs the rotational speed signal corresponding to the rotational speed of the motor as the motor driving information signal So from the output terminal P3, and upon detecting that the supply of the first supply voltage Vdc is stopped, the control circuit 21 switches the motor driving information signal So to be outputted from the output terminal P3 from the rotational speed signal to the history information 300.

According to this, it is not necessary to separately provide external terminals to output the history information 300 for both the motor drive control device 1 and the host device 2, and it is thereby possible to further simplify the configuration of the motor drive control system 100.

For when the control circuit 21 is out of control, the motor drive control device 1 is provided with the out-of-control signal generation circuit 20 that outputs an out-of-control signal indicating that the control circuit 21 is out of control. This allows the host device 2 to know that the control circuit 21 is out of control.

The out-of-control signal is a signal with a duty ratio different from the duty ratio of the rotational speed signal (FG signal), and is outputted from the output terminal P3 as the motor driving information signal So. According to this, the host device 2 can recognize and distinguish between the out-of-control signal inputted from the same terminal and the rotational speed signal. Since it is not necessary to separately provide external terminals to communicate an out-of-control signal for both the motor drive control device 1 and the host device 2, it is possible to further simplify the configuration of the motor drive control system 100.

The out-of-control signal generation circuit 20 is an oscillation circuit configured to stop oscillation operation when the control circuit 21 is in a controllable state and perform oscillation operation when the control circuit is out of control. This makes it easier to generate a signal with a duty ratio different from the duty ratio of the rotational speed signal (FG signal). When the control circuit 21 is in a controllable state, it is possible to prevent adverse influences on the rotational speed signal or the history information 300 outputted from the output terminal P3.

Furthermore, in the motor drive control system 100 according to the present embodiment, when a pulse signal with a predetermined duty ratio is outputted to the input terminal P2 of the motor drive control device 1 as the drive command signal Sc, if it is detected that the rotational speed signal is not outputted from the output terminal P3 of the motor drive control device 1, the host device 2 outputs a pulse signal with a duty ratio of 100% to the input terminal P2 as the drive command signal Sc.

According to this, when the first supply voltage Vdc is interrupted, the motor drive control device 1 is set in an operation stopped state, and the rotational speed signal cannot be outputted, the host device 2 supplies the drive command signal Sc as the second supply voltage to the motor drive control device 1, making it possible to speedily restore the control circuit 21 to the operable state. This allows the host device 2 to acquire the history information 300 of the motor 3 immediately after an abnormality occurs in the motor drive control device 1.

Extension of Embodiments

Although the disclosure made by the present inventors has been specifically described based on the embodiments so far, it goes without saying that the present disclosure is not limited to the embodiments but can be changed in various ways without departing from the spirit and scope of the present disclosure.

For example, whether or not to install the protective circuit 9, the supply voltage detection circuit 16, the input/output signal conversion circuit 17, the temperature sensor 18 and the current detection circuit 19 in the motor drive control device 1 in the above embodiments can be changed as appropriate according to the application and specification of the motor drive control device 1. For example, when the level of a signal that can be inputted/outputted by the host device 2 and the level of a signal that can be inputted/outputted by the control circuit 21 are identical, those signals may be transmitted/received between the host device 2 and the control circuit 21 via the input terminal P2 and the output terminal P3 without providing the input/output signal conversion circuit 17.

In the above-described embodiments, the second supply voltage is inputted from the second terminal to which the drive command signal Sc is inputted, but the terminal from which the second supply voltage is inputted need not be limited to the second terminal, and the second supply voltage may be inputted from another terminal.

The number of phases of the motor driven by the motor drive control device according to the above-described embodiments is not limited to three. The number of Hall elements is not limited to three either.

In the above-described embodiments, the method for detecting the rotational speed of the motor is not particularly limited. For example, the rotational speed may be detected based on a back electromotive force of the motor as a sensor-less scheme without using any Hall element. The motor drive scheme is not limited to the sine wave drive scheme. For example, a rectangular wave drive scheme or a trapezoidal wave drive scheme or a drive scheme with special modulation applied to a sine wave may also be applicable.

In the above-described embodiments, the type of the motor 3 is not particularly limited. For example, the motor 3 is not limited to a brushless DC motor, and the motor 3 may also be a stepping motor.

The control circuit 21 is not limited to the circuit configuration as described above. Various circuit configurations made so as to meet the object of the present disclosure are applicable to the control circuit 21.

The above-described timing charts and sequence diagrams are examples, and the present disclosure is not limited to them, and other processes may be inserted between the steps or processes may be parallelized.

Part of or all the processing in the above-described embodiments may be executed by software or by a hardware circuit. That is, at least parts of the respective components of the motor drive control device 1 may be configured to be implemented not through processing by hardware but through processing by software.

What is claimed is:

1. A motor drive control device comprising:
   a first terminal, a second terminal and a third terminal;
   a drive voltage generation circuit configured to generate a drive voltage based on a first supply voltage inputted to the first terminal and generate the drive voltage based on a second supply voltage inputted to the second terminal when a supply of the first supply voltage is stopped;
   a control circuit configured to be operable by a supply of the drive voltage, generate a drive control signal based on a drive command signal including a command relating to a drive of a motor, generate a motor driving information signal relating to a drive state of the motor and output the motor driving information signal from the third terminal; and a motor drive circuit configured to output a drive signal to the motor based on the drive control signal generated by the control circuit, wherein the control circuit monitors the first supply voltage and outputs history information relating to operation of the motor from the third terminal as the motor driving information signal upon detecting that the supply of the first supply voltage is stopped.

2. The motor drive control device according to claim 1, wherein the second terminal is an input terminal to input the drive command signal, upon detecting that the first supply voltage is supplied and when the drive command signal is inputted to the second terminal, the control circuit generates the drive control signal based on the drive command signal, and upon detecting that the supply of the first supply voltage is stopped and when the drive command signal with a duty ratio of 100% is inputted to the second terminal, the drive voltage generation circuit generates the drive voltage using the drive command signal as the second supply voltage.

3. The motor drive control device according to claim 2, wherein upon detecting that the first supply voltage is supplied, the control circuit outputs a rotational speed signal corresponding to a rotational speed of the motor from the third terminal as the motor driving information signal, and upon detecting that the supply of the first supply voltage is stopped, the control circuit switches the motor driving information signal to be outputted from the third terminal from the rotational speed signal to the history information.

4. The motor drive control device according to claim 3, further comprising an out-of-control signal generation circuit configured to output an out-of-control signal indicating that the control circuit is out of control from the third terminal as the motor driving information signal when the control circuit is out of control, wherein the rotational speed signal is a signal with a predetermined duty ratio, and the out-of-control signal is a signal with a duty ratio different from the duty ratio of the rotational speed signal.

5. The motor drive control device according to claim 4, wherein the out-of-control signal generation circuit is an oscillator, and the out-of-control signal generation circuit stops oscillation operation when the control circuit is controllable and performs oscillation operation when the control circuit is out of control.

6. The motor drive control device according to claim 1, wherein the drive voltage generation circuit comprises a first power supply circuit configured to generate a first DC voltage as the drive voltage based on the first supply voltage and supply the first DC voltage to a power supply terminal of the control circuit and a second power supply circuit configured to generate a second DC voltage based on the second supply voltage as the drive voltage and supply the second DC voltage to the power supply terminal, and the second power supply circuit comprises a regulator circuit configured to generate the second DC voltage based on the second supply voltage and a voltage monitoring circuit configured to monitor the first DC voltage and stop operation of the regulator circuit when the first DC voltage is larger than a predetermined threshold and enable the regulator circuit to operate when the first DC voltage is smaller than the predetermined threshold.

7. The motor drive control device according to claim 1, wherein the history information comprises cumulative information indicating a degree of usage of the motor and the cumulative information comprises at least one piece of information on a cumulative operating time of the motor and a cumulative number of rotations of the motor.

8. The motor drive control device according to claim 1, wherein the history information includes operation state information indicating an operation state of the motor, and the operation state information comprises at least one piece of information on a temperature, a drive current of the motor and the drive voltage.

9. The motor drive control device according to claim 1, wherein the history information comprises abnormality detection information indicating a content of a detected abnormality, and the abnormality detection information includes at least one piece of information on a temperature, a drive current of the motor and an abnormality relating to the drive voltage.

10. A motor drive control system comprising:

the motor drive control device according to claim 1; and a host device configured to output a pulse signal to the second terminal of the motor drive control device as the drive command signal and receive a rotational speed signal corresponding to a rotational speed of the motor from the third terminal of the motor drive control device, wherein the host device outputs a pulse signal with a duty ratio of 100% to the second terminal upon detecting that the rotational speed signal is not inputted from the third terminal.

11. A fan system comprising:

the motor drive control device according to claim 1;

the motor; and a fan comprising an impeller configured to rotate by a rotational force of the motor.

* * * * *